United States Patent
Cole, Jr.

[15] 3,702,438
[45] Nov. 7, 1972

[54] DIODE TESTER

[72] Inventor: Everett N. Cole, Jr., Tewksbury, Mass.

[73] Assignee: Consolidated Design, Inc., Lowell, Mass.

[22] Filed: Dec. 23, 1969

[21] Appl. No.: 887,711

[52] U.S. Cl. ..................................324/158 F, 209/73
[51] Int. Cl. .........................G01r 31/22, B65g 11/20
[58] Field of Search .324/158, 158 F, 158 D; 193/43; 198/41, 33 AA; 221/156, 171, 212; 209/73

[56] References Cited

UNITED STATES PATENTS

| | | | |
|---|---|---|---|
| 3,388,795 | 6/1968 | Beroset et al. | 209/73 |
| 1,080,435 | 12/1913 | Gamper | 198/33 AA |
| 3,120,890 | 2/1964 | Waltz | 198/33 AA |
| 3,575,304 | 4/1971 | Hurst | 198/33 AA |
| 2,823,781 | 2/1958 | Bosch | 193/43 |
| 2,975,878 | 3/1961 | Cason | 193/43 |
| 3,234,496 | 2/1966 | Cedrone | 324/158 X |
| 3,252,571 | 5/1966 | Hinkle et al. | 193/43 X |
| 3,253,735 | 5/1966 | Brown et al. | 193/43 X |
| 3,304,499 | 2/1967 | Vincze | 324/158 |

FOREIGN PATENTS OR APPLICATIONS

| | | | |
|---|---|---|---|
| 1,130,602 | 10/1968 | Great Britain | 198/33 AA |
| 1,141,753 | 1/1969 | Great Britain | 198/41 |

*Primary Examiner*—Rudolph V. Rolinec
*Assistant Examiner*—Ernest F. Karlsen
*Attorney*—Cesari and McKenna

[57] ABSTRACT

A diode handler magnetically orients diodes fed to it in random orientation, supplies them one at a time to a test station, and stacks them, after testing, with their anodes pointed in the same direction.

16 Claims, 11 Drawing Figures

INVENTOR.
EVERETT N. COLE, JR.
BY Blair, Cesari and St.Onge

ATTORNEYS

INVENTOR.
EVERETT N. COLE, JR.
BY Blair, Cesari and St. Onge

ATTORNEYS

DIODE TESTER

BACKGROUND OF THE INVENTION

A. Field of the Invention

The invention relates to an electrical component handler and, more particularly, to a diode handler.

B. Prior Art

A diode handler aligns diodes in a uniform direction for transfer to a test station and, after testing, transfers them to a stacking station.

Frequently, the diodes are presented to the handler with random spatial orientation, that is, the leads of the diodes point in a multiplicity of directions. Accordingly, it is necessary to orient the diodes prior to feeding them to the test station. This orientation comprises alignment of the leads of the diodes in a uniform direction so that the diodes are parallel to each other.

Presently, a variety of different techniques are utilized to orient diodes. Frequently, these techniques involve the use of a large number of moving parts whose motions are required to be rather precisely synchronized with each other to orient the diodes and maintain them in a uniform position for testing and for transfer to other parts of the machine. Such machines, because of their complexity, are expensive to build and maintain, are readily subject to jam-up or breakdown with consequent loss in production, and have a limited testing rate. A common technique for orienting diodes with initially random orientation is to vibrate the diodes in a "shaker" or "vibrator" having a large central bowl into which diodes may be fed in random orientation and having a narrow circular track at its outer periphery into which the diodes are carried by the vibrations and from which they may be removed with predetermined orientation. Vibrators of this type are often bulky, expensive, and costly to maintain. Further, because the diodes are rapidly vibrated against each other in the central bowl, their leads frequently bend; care must therefore be taken to remove diodes with bent leads from the exit track lest they jam the handler in subsequent operations. This is inconvenient and wasteful of time and expensive in terms of production costs. In addition, the internal structure of the diodes is subject to damage by the vibrations and some components are therefore destroyed during this stage.

After the diodes have been tested and prior to their packaging for shipment, it is often desired to "polarize" the diodes, that is, orient them such that their anode-cathode junctions face in a given direction. A variety of techniques are used to accomplish this, many of which are quite complex. It is desirable to have a simple means of polarizing diodes at high production rates.

In constructing an automatic diode handler, it is necessary to control the sequence of operations performed by the handler. Generally, this is accomplished through the use of limit switches and similar electromechanical devices which sense the position of a part and generate an electrical signal when the part reaches a predetermined position. Such switches wear rapidly in extensive use and must frequently be replaced.

OBJECTS OF THE INVENTION

Accordingly, it is an object of the invention to provide an improved electrical component tester.

Further, it is an object of the invention to provide an improved diode tester.

A further object of the invention is to provide an improved diode tester which accepts diodes of random orientation and orients them in a uniform alignment for testing.

Another object of the invention is to provide an improved diode tester which orients the electrical junctions of the diodes in a uniform direction after testing.

Yet another object of the invention is to provide an improved diode tester having non-vibratory alignment means for aligning the diodes.

A further object of the invention is to provide an improved sequence controller for controlling the sequence of various operations in electromechanical machinery.

BRIEF DESCRIPTION OF THE INVENTION

I have developed a machine to efficiently and expeditiously orient diodes for electrical testing and transfer them from station to station while maintaining the desired orientation. My machine utilizes magnets located at various stations within the machine to establish and maintain the desired orientation and to assist in polarizing the diodes after testing. A photocell timing unit synchronizes the operation of various components in transferring the diodes to, and removing them from, the test station.

In accordance with the invention, diodes having random alignment are fed to a receiving station comprising a receiving chute and stacker in which the diodes are uniformly oriented in a desired direction by means of permanent magnets positioned adjacent the chute to establish a field extending through it. The diodes are removed from this chute one at a time and fed to a vertical stacker unit for subsequent transfer to a test station; they are maintained in a uniform orientation in the vertical stacker by means of a second pair of magnets adjacent the stacker. The diodes are removed from the vertical stacker one at a time by a transfer arm which carries them to a test station where the electrical characteristics of the diode are determined by applying predetermined driving signals (voltage or current) to them and measuring their response. After testing, the diodes are then polarized, that is, oriented such that their anode-cathode junctions uniformly face a given direction, and are then fed to a final stacker where they are assembled and stacked for removal from the machine.

In addition to testing diodes, the handler of the present invention is also useful in handling any component having axially extending, magnetically susceptible leads and is especially useful in handling and polarizing electrolytic capacitors.

DETAILED DESCRIPTION OF THE INVENTION

For a fuller understanding of the nature and objects of the invention, reference should be made to the following detailed description of the invention taken in connection with the accompanying drawings, in which:

FIG. 5 is a schematic diagram of a diode transfer operation;

Figure 1:
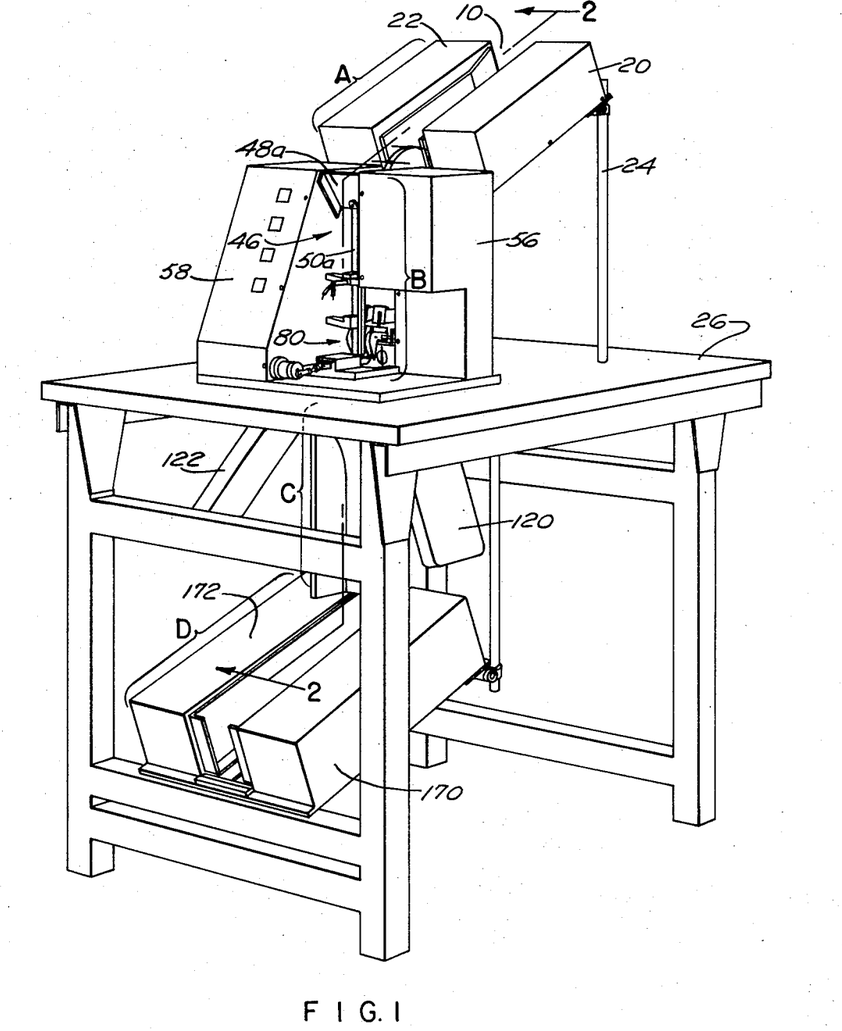
FIG. 1 is a view in perspective of a diode tester constructed in accordance with the present invention.
Figure 2:
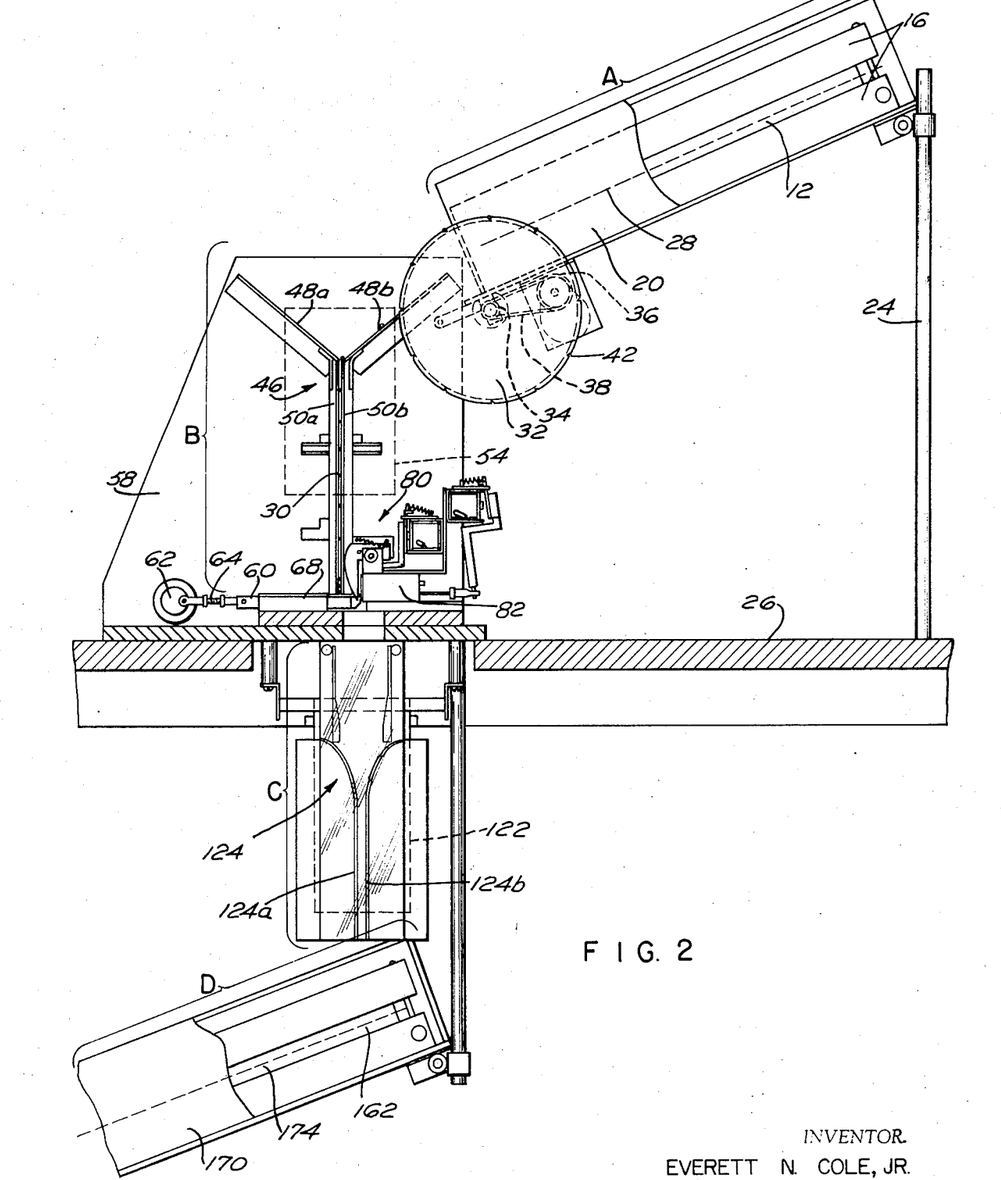
FIG. 2 is a side sectional view taken along the lines 2.2. of FIG. 1.
Figure 3:
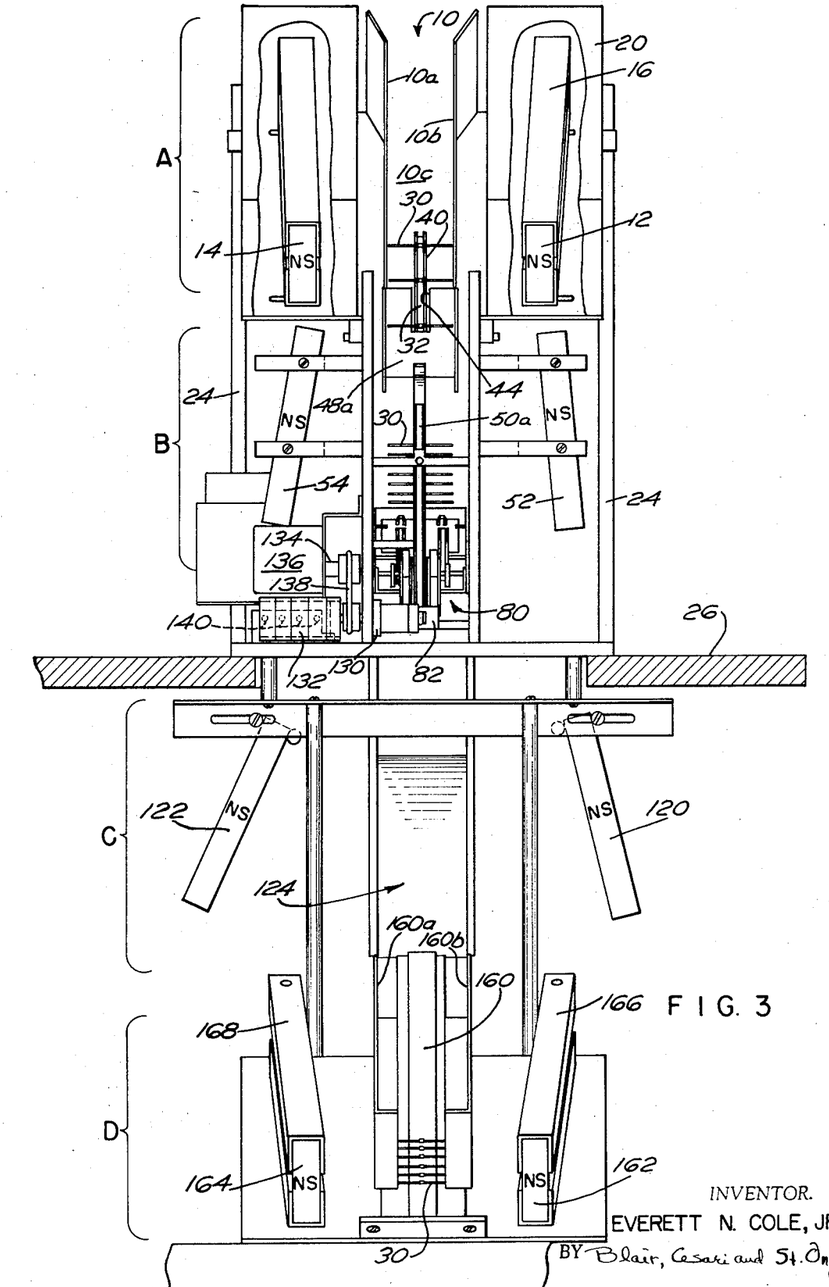
FIG. 3 is a front elevational view of the machine of FIG. 1.

In FIGS. 1–3, a diode tester 10 constructed in accordance with the invention is shown as comprising four major operational stations, these being a receiving and first stacking station A, a vertical stacking and test station B, a polarizer station C, and a third stacking station D.

The receiving and first stacking station A receives diodes fed to it with random orientation and aligns these diodes in a uniform direction while stacking them for transfer to a test station. Station A is composed of an inclined receiving chute 10 having side walls 10a and 10b spaced from each other by a distance slightly greater than the length of the diodes to be tested, and a bottom face 10c. A pair of permanent magnets 12 and 14 disposed within adjustaBle holding clamps 16 and 18, respectively, are encased within housings 20 and 22, respectively, on either side of the chute 10. Supports 24 support the receiving station above a table 26.

The magnets 12 and 14 are magnetized with their poles on opposite side faces, instead of opposite ends as is usually the case. Further, these magnets are oriented such that opposite poles face each other across the chute when the magnets are positioned adjacent the chute 10. Thus, as seen more clearly in FIG. 3, when the inner pole face of the magnet 12 facing chute 10 is magnetized so as to form a north pole, the outer pole face (turned away from chute 10) forms a south pole as does the inner pole face of the magnet 14. As a result of this orientation, the magnets 12 and 14 generate a magnetic field having continuous flux lines extending through the chute 10 from the magnet 12 to the magnet 14.

The magnets are located such that the locus of maximum magnetic field strength occurs along a line 28 (FIG. 2) located above the bottom of chute 10. Further, they are inclined toward each other at the bottom or exit portion of the chute in order to provide a field through the chute which decreases from a maximum at the upper or entrance portion of the chute to a minimum at the lower or exit portion of the chute. To prevent shorting of the flux, the chute 10, the clamps 16 and 18, and the protective covers 20 and 22 are formed from material having a low magnetic susceptibility, for example, aluminum.

Diodes 30 initially presented to the chute in random orientation are uniformly aligned by the magnetic field of the magnets such that they are positioned transverse to the side walls of the chute. Further, they are positioned by the field along the line of maximum magnetic field strength where the magnetic flux through their lead wires (which are of high magnetic susceptibility) is a maximum. Because this line of maximum flux is inclined to the horizontal, along with the chute 10, the diodes tend to move under the force of gravity to the lower or exit portion of the chute where they are available for transfer to the test station.

At the exit portion of the chute 10 is located a pickup wheel 32 pivoted about a shaft 34 for rotation. The wheel 32 is driven in a counterclockwise direction from a motor 36 through a chain drive 38 (FIG. 2) It extends into chute 10 through an aperture 40 (FIG. 3) and has notches 42 spaced about its outer periphery to pick up, one at a time, diodes which congregate at the exit portion of the chute 10. The wheel 32 also extends through an aperture 44 (FIG. 3) into a chute 46 in the stacking and test zone B. The chute 46 is formed from a pair of inclined walls 48a, 48b joined to a vertical chute 50 having spaced apart walls 50a and 50b. The wheel 32 carries the diodes from the chute 10 to the wall 48b of the chute 46 where they drop from the wheel and fall along wall 48b into chute 50. Magnets 52 and 54 (FIG. 3) are disposed adjacent the chute 46 to assist in transfer of the diodes from the wheel 32 and to maintain the orientation of the diodes during their transfer to the chute 50.

The magnets 52 and 54 are magnetized along their broad faces, as was the case with the magnets 12 and 14, and are oriented such that the inner face of one magnet contains a pole of opposite magnetic sign to the pole on the inner face of the other magnet, thereby forming a continuous magnetic field extending from the inner face of one magnet to the inner face of the other through the area occupied by the chute 46. These magnets are enclosed in protective housings 56 and 58 respectively (the housing is not shown in FIG. 3, for clarity), which, together with the chute 40 and its associated structure, are formed from non-magnetic material (i.e., material of low magnetic susceptibility, such as aluminum). The magnets 52 and 54 are angled toward each other at their upper ends so as to generate a field which is most intense at the upper portion where it is required to maintain alignment of the diodes during the transfer from the wheel 32 and is weakest at their lower ends where the diodes 30 are stacked on top of each other within the chute 50 and no longer need the field to maintain their orientation.

At the lower end of the vertical guide chute 50 is a transfer arm 60 driven from a rotary shaft 62 through an adjustable linkage 64. The arm 60 moves in horizontal reciprocating motion through a guide block 66 beneath a cover plate 68. A forward end 60a (shown more clearly in FIG. 5) of arm 60 has a cradle in the form of a notch 70 for receiving diodes from the chute 50 and transferring them to a test station 80.

As will be seen more clearly in FIG. 5, the clearance between the upper face of arm 60 and the lower edge of the chute 50 is less than the thickness of a diode so that no diodes can escape from the chute 50 until the notch 70 on arm 60 passes beneath the chute and is aligned with the exit opening of the chute. At that point, a single diode falls into the notch 70 and is carried by the arm 60 to the test station 80.

The test station 80 comprises a test block 82 of a nonconductive material having pairs of electrically conductive contacts 84 and 86 extending from it for applying electrical signals to the diode being tested. These contacts are energized through leads 88 and 89 from control circuitry located in the housing 58. Solenoids 90 and 92 imbedded in the test block 82 behind the electrical contacts 84 and 86 apply an attractive magnetic field to the lead wires of the diode being tested so as to clamp this diode firmly against the test contacts during the testing operation; these solenoids are also energized from the control console 58 via leads 94 and 96.

Figures 6, 7:
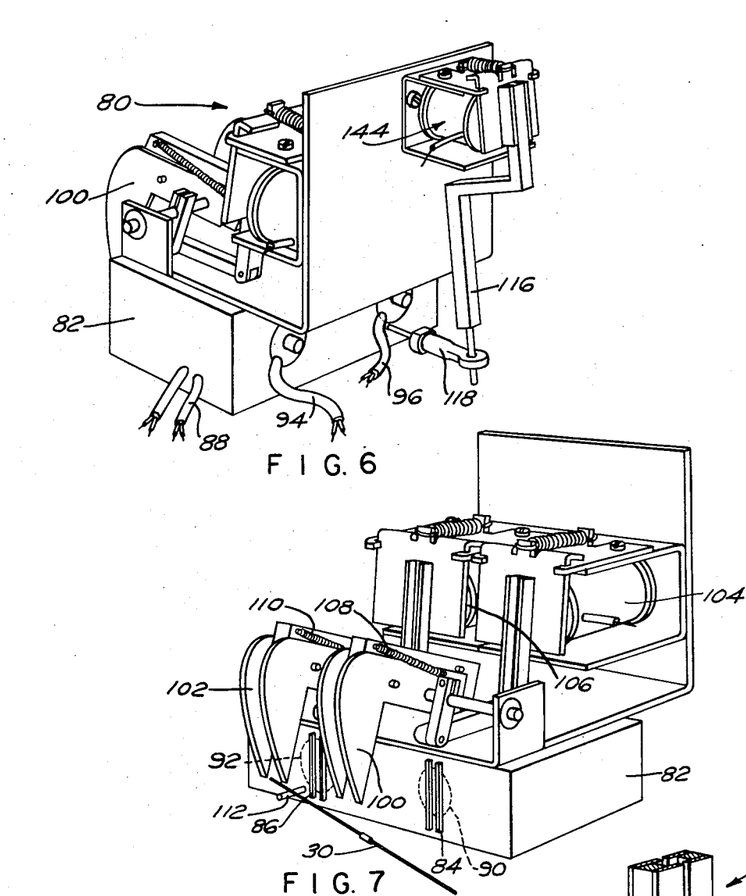
FIGS. 6 and 7 are enlarged perspective views of the diode test station.

A pair of clamps 100 and 102 are pivotally mounted on test block 82 and are actuated by solenoids 104 and 106; the clamps are insulated from the handler so as not to short-circuit testing conducted at the station 80. Springs 108 and 110 hold the clamps 100 and 102 in the normally open or raised position as shown in FIG. 7. When energizing signals are applied to solenoids 104 and 106, the clamps 100 and 102 swing down into a lowered or closed position and press a diode against test contacts 84 and 86 for testing. In addition to the electrical contacts 84 and 86, the clamps 100 and 102, and the various actuaing solenoids, the test block 82 contains a "polarizer" pin 112 extending through the block 82 from rear to front and actuated by a solenoid 114 via arm 116 and linkage 118. The pin 112 is normally retracted within the block 82 but is extended forward when solenoid 114 is energized.

Figure 4:
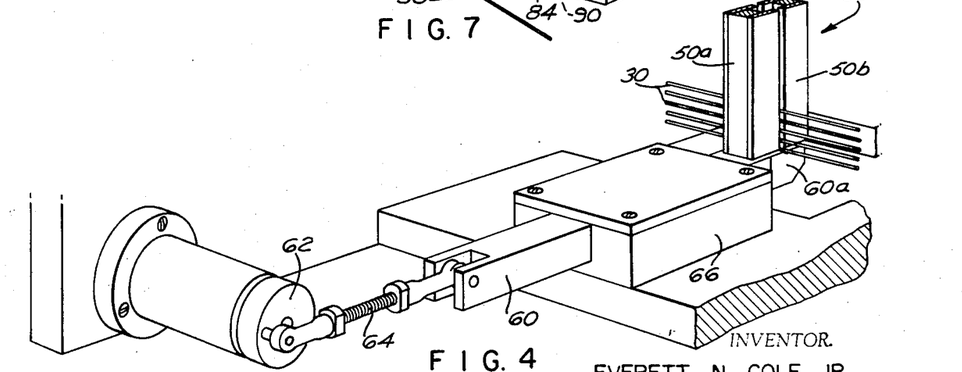
FIG. 4 is a view in perspective of the diode transfer arm used in the present invention.

The mechanism by which a diode is carried from the exit portion of chute 50 to the test station will more readily be understood on reference to FIGS. 4 and 5 of the drawings. When the arm 60 is in its leftmost position, the notch 70 is aligned with the exit point of chute 50 and a single diode drops into the notch. The arm 60 is then driven to the right by shaft 62 and carries the diode 30 toward the test block 82. As the arm 60 approaches its rightmost position, the solenoids 90 and 92 are energized from the control console 58 to draw the diode from the arm 60 and transfer it to the test electrodes 84, 86. The solenoids 104 and 106 are then energized from the control console to press the clamps 100 and 102 firmly against the diode. The solenoids 90 and 92 may now be de-energized.

After a diode 30 is brought to the test station 80 and pressed firmly against the electrodes 84, 86, it is ready for testing. This is accomplished by energizing the electrodes 84, 86 from the control console 58 via leads 88 and 89. To minimize effects of contact resistance, a Kelvin electrode arrangement is used, that is, a driving current is applied to one pair of electrodes, for example, electrodes 84a and 86a and the voltage response is measured at the other pair of electrodes 84b and 86b. Various characteristics of the diode may be tested by applying appropriate signals (pulses, D.C. signals, etc.) to the electrodes 84, 86 and measuring the response of the diode to these signals. One desirable test is to measure the current flowing through the diode as compared to the voltage across it with a given electrode, for example, electrode 84, positive. If the current through the diodes is of the order of a few hundreds of milliamperes for a 1-volt drop across the diode, the diode is then known to be oriented with its anode closest electrode 84. If, on the other hand, the current is of the order of microamperes, the diode is polarized in the reverse direction, that is, its anode is closest the electrode 86 and its cathode closest the electrode 84. This information can be used to orient the diodes in a uniform manner as described in detail hereinafter.

After the testing has been completed, the solenoids 104, 106 are de-energized, and the diode 30 is then allowed to fall from the test electrodes into the polarizing station C which comprises a pair of permanent magnets 120 and 122 located on opposite sides of a vertical chute 124 having side walls 124a and 124b (FIGS. 2 and 3) converging from a flared upper portion to a parallel lower portion. The magnets 120, 122 are oriented to generate a continuous magnetic field extending from side to side through the chute 124 and parallel to the walls 124a and 124b. This field is strongest at their upper ends and weakest at their lower ends. If the diode 30 is polarized in the desired direction as determined at testing station 80, it falls freely from the test block 82 on release from the electrodes 84, 86. In transversing the distance between the electrodes 84, 86 and the field established by magnets 120, 122, it may rotate slightly but such rotation will generally not be more than a few degrees and will always be less than 90 degrees. On entering the field, the diodes will be realigned by the field into the same orientation as they possessed at the electrodes 84, 86.

Figures 5A, 5B, 5C, 8:
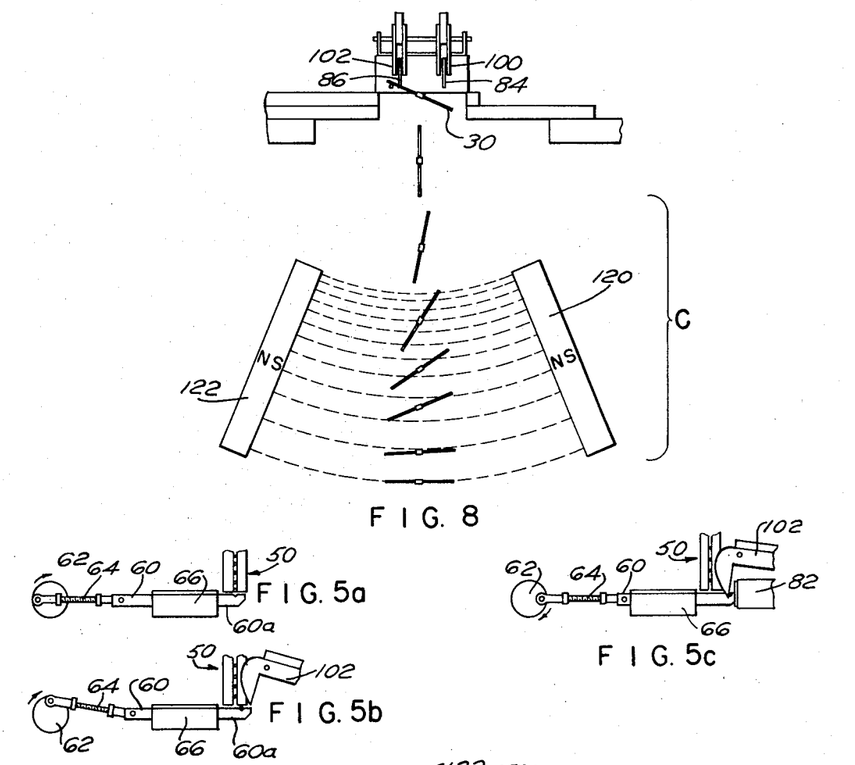
FIG. 8 is a schematic front view of a diode polarizing operation.

If, in contrast, the diode is not polarized as desired (as determined, for example, by measuring the current through the diode in response to a given voltage), the test circuitry (not shown) in the control console 58 energizes solenoid 114 to extend pin 112 forwardly from the block 82 and into the free-fall path of diode 30. On falling from electrodes 84, 86, one end of diode 30 strikes pin 112 and the diode begins to rotate as it falls. As seen in FIG. 8, the spacing between pin 112 and magnets 120, 122 is such that diode 30 rotates through an angle greater than 90° prior to entering the field of these magnets. On entering this field, the diodes are further rotated by the field to a position where they are turned a full 180° with respect to their orientation at the test electrodes 84, 86. Thus, regardless of their polarization at the test electrodes, the diodes 30 are uniformly polarized in the same direction on exit from the polarizing station C.

In order to ensure that the diodes are removed from the transfer arm 70 by the solenoids 90, 92, pressed against the test contacts 86 and 88, held against these by the clamps 100, 102, released, and rotated (when necessary) by the pin 110, all in the proper sequence, it is necessary to establish some common time reference to which all the operations can be synchronized. This is done by synchronizing these operations with the movement of the transfer arm 70. Since arm 70 is driven from rotary shaft 72 (FIG. 2), the angular orientation of this shaft provides a convenient reference for the synchronizing operations. As may be seen from FIG. 3, the shaft 72 extends through a collar 130 to a photocell illuminating unit 132 mounted to rotate with the shaft. The shaft 72 and therefore the illuminating unit 132 are driven from a shaft 134 of a motor 136 through a driving belt 138. Photodiodes 140 are mounted on a stationary platform immediately adjacent the rotating illuminating unit 132.

Figure 9:
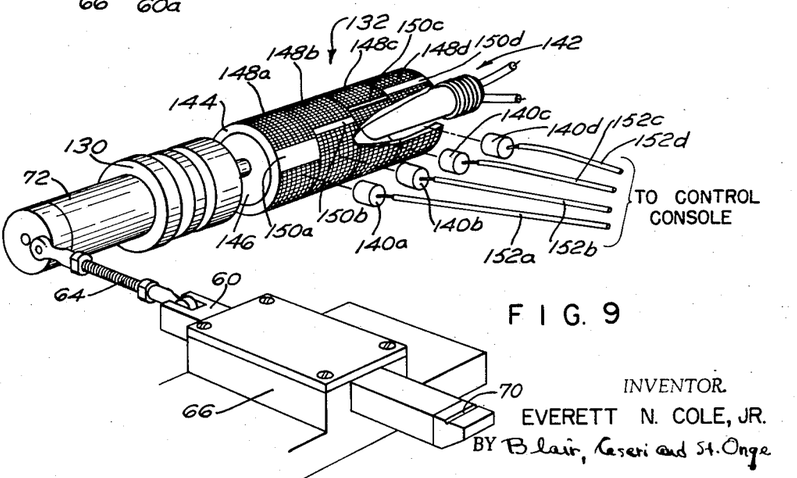
FIG. 9 is a schematic view in perspective of a photocell timer used in the present invention.

As will be seen more clearly in FIG. 9, the unit 132 contains an illuminating source 142 extending into one end of a shell 144 connected to rotary shaft 72 by a web 146. The source 142 may be electrically energized from a convenient source through a pair of leads 143 and is stationarily supported adjacent unit 132. The surface of the shell 144 is divided into control segments 148a, 148b, 148c, and 148d which are opaque to light everywhere except at a very small segment in each band shown as 150a, 150b, 150c and 150d. The unit 132 may readily be formed from a transparent shell coated with an opaque paint everywhere except in the areas of the bands 150. Other methods, of course, may be alternatively used to form the shell.

As the unit 132 rotates in the direction shown in FIG. 9, the band 150a rotates to a position directly beneath photocell 140a and thereby illuminates this photocell with light from the source 142. The remaining photocells, being positioned opposite opaque portions of their respective bands, are not illuminated from the source 142 at this time. The photocell 142a thereupon transmits a signal via a lead 152a to the control console 58 (FIG. 2) where it is amplified and then applied to solenoids 90 and 92 to remove the diode from the arm 70 and transfer it to the diode test block 84.

The solenoids 90 and 92 remain actuated while the translucent segment 150b in band 148b passes under photocell 140b. The signal generated in this photocell is applied by a lead 152b to the control console 58 where it is amplified and then applied to solenoids 104 and 106 to rotate the clamps 100, 102 against the diode and to press the diode against the electrode throughout the test.

Next, the translucent segment 150c in band 148c passes under photocell 140c to energize lead 152c. This causes the control console 58 to energize the test electrodes 84a and 86a so that the proper sequence of electrical signals is applied to these electrodes to test the electrical characteristics of the diode.

Finally, the translucent segment 150d in the band 148d is brought under the photocell 140d to energize lead 152d. The signal on the lead 152d is applied to a logic circuit (not shown) in the console 58 together with a signal from the electrodes 84, 86 indicating whether or not the diode being tested is polarized in the desired direction. If the diode is properly polarized, the solenoid 114 is not energized at this time and the pin 110 therefore remains retracted in the block 82. If, on the other hand, the diode is not properly polarized, the logic circuit provides a signal to a driver circuit which energizes the solenoid 114 to extend the pin 110 and thereby re-orient the diode after its release from the test block as previously described.

A simple logic circuit comprises, for example, a level discriminator to which the output voltage of the diode under test is applied. The output of the level discriminator is applied to an AND gate together with the signal from lead 152d. The output of the AND gate is applied through an inverter to solenoid 112. When a signal appears on the lead 152d and the output of the level discriminator is high, the output of the AND gate is high and the output of the inverter is low, thereby indicating that the diode is polarized with its anode in the proper direction and that the pin 110 is not to be extended. On the other hand, when the signal in the lead 152d is high and the output of the level discriminator is low, the output of the AND gate is low and the output of the inverter is high. This indicates that the solenoid 112 is to be driven to extend the pin 110 and therefore re-orient the diode after it leaves the test block.

Returning now to the diodes exiting from the polarizer station C, these diodes transit to a final stacking station D consisting of a chute 160 having sidewalls 160a and 160b. A pair of magnets 162, 164 are positioned adjacent the walls 160a, 160b and are held within adjustable frames 166 and 168. The magnets and frames are enclosed within protective covers 170 and 172 respectively (FIG. 2). The magnets 162 and 164 are magnetized along their broad, flat faces such that opposed faces of these magnets present poles of opposite polarity to each other as was the case with magnets 12 and 14 in station A. They are likewise angled toward each other at their lower ends to generate a magnetic field of greater intensity at the bottom of chute 160 than at the top. The components adjacent the magnet including the chute 160, the frames 166 and 168, and the protective covers 170 and 172 are formed from a non-magnetic material such as aluminum. The line of maximum magnetic field intensity follows very closely a line such as the line 174 shown in FIG. 2. Diodes exiting from the polarizing station C enter the stacking station D at the upper end as they move down the chute 160 under the force of gravity and generally along the line 174. As diodes accumulate, they cluster around this line at the lower end of the chute, but maintain their horizontal alignment due to the field of magnets 162 and 164. As is the case with magnets 12, 14 and 52, 54, this prevents jam-ups due to misalignment of the diodes during stacking or transfer.

It should be noted that when diodes are to be separated according to their various electrical characteristics as determined at test station 80, the final stacker station D may be replaced by a sorter column which sorts the diodes exiting from the polarizer station C into one of a number of separate bins dependent on the measured characteristics. Such a sorter is known to those skilled in the art and need not be described in detail herein.

It will be apparent from the foregoing that I have provided a simple and efficient diode tester that is economical to construct and operate. The tester utilizes permanent magnets to align the diodes at various points within the tester to thereby facilitate transfer operations and to avoid jamming of the machine by disoriented diodes.

Additionally, I have provided a simple and inexpensive method of synchronizing the operation of various portions of the tester. This is accomplished by means of a photocell illuminating unit which selectively illuminates a bank of photocells at times synchronized with the operation of a diode transfer arm.

It will be clear to those skilled in the art that various portions of the test machine described herein may be used separately for performing single functions apart from the entire machine itself. For example, the diode receiving and feed mechanism of station A may conveniently be used in any operation in which it is desired to horizontally align diodes or other components having magnetically susceptible leads. Further, the diode polarizing unit of stations B and C may be used as shown in the present invention or may be used with different types of testers. Additionally, the photocell illuminating and synchronizing unit will find numerous applications when it is desired to synchronize the operation of a rotating or reciprocating member with the operation of other electromechanical components.

Having illustrated and described a preferred embodiment of my invention, I claim:

1. In a machine for testing electrical components, each of which has at least a portion thereof formed from a magnetically-susceptible material, the improvement which comprises apparatus for orienting said components in a preferred direction, said apparatus comprising:

A. means defining a feed chute having side walls and a bottom wall for receiving a multiplicity of components presented simultaneously thereto in random spatial orientation; and B. stationary magnet means oriented to generate a static magnetic field:
1. transverse to said side walls and extending through said chute from one side wall to the other to thereby align said components in the transverse direction,
2. defining a path of maximum magnetic intensity extending downwardly with respect to the horizontal from an entrance point thereof to an exit point thereof and supporting the components in the chute above the bottom wall, the components moving down the chute along said path from the entrance point thereof to the exit point under the influence of gravity.

2. Apparatus according to claim 1 in which said magnet means comprises at least one permanent magnet adjacent to said feed chute.

3. Apparatus according to claim 1 in which said magnet means comprises first and second permanent magnets adjacent said feed chute and oriented to produce additive magnetic fields within said chute.

4. A machine according to claim 1 which includes means for transferring said components from the receiving chute to a loading station, said means including a wheel rotatably mounted adjacent said feed chute and having a notched periphery extending into said feed chute and contacting aligned components therein for removing components from said chute one at a time.

5. A machine according to claim 4 in which the means for transferring components to said loading station includes a second vertical stacking chute for receiving components from said wheel and guiding them to said loading station and means generating a magnetic field extending horizontally through said second feed chute for maintaining said components in a fixed orientation during transfer to said stacking chute.

6. A machine according to claim 1 which includes means for feeding said components from a loading station to a test station, said means including an arm reciprocating between said stations and adapted to receive a component from said loading station for carriage to said test station during each reciprocating cycle.

7. A machine according to claim 6 in which said arm is positioned for reciprocating motion beneath said loading station and is adapted to allow release of a component from said station by force of gravity during each reciprocating cycle for carriage to said test station and to prevent the release of other components in said station during said cycle.

8. A machine according to claim 7 in which said loading station comprises a vertically-extending guide section in which said components are horizontally oriented and vertically stacked and in which said arm comprises a smooth block having a notched cradle portion therein, said cradle portion passing beneath said guide section during each cycle for receiving a component therein, the remaining portion of said arm blocking said guide section to prevent release of a component therefrom when said cradle portion moves from said guide section.

9. A machine according to claim 6 in which the means for feeding said components to said test station includes transfer means for removing said components from said arm when said arm is extended toward said test station.

10. A machine according to claim 9 in which said test station includes a pair of electrodes spaced apart from each other and adapted to contact said components for testing, and further includes at least one pair of jaws for removing said components from said arm and for carrying them to said electrodes.

11. In a machine for testing electrical components, each of which has conductive lead wires of a magnetically susceptible material extending therefrom, the improvement which comprises apparatus for orienting said components in a preferred direction for delivery to a testing station, said apparatus comprising:

A. means defining a feed chute for receiving said components therein in random spatial orientation;

B. magnet means for generating a transverse magnetic field within said chute to thereby align said components in the transverse direction while defining a path along said chute for traversal by said components;

C. means for removing said components from said feed chute for delivery to said testing station; and D. means for orienting said components in one of two oppositely directed horizontal orientations after testing dependent on the electrical characteristics of the components observed during testing, said orienting means comprising:
1. deflecting means selectively operable to rotate said component on release from said test station dependent on the measured characteristics of said component;
2. magnetic means adjacent said deflecting means for fixing the orientation of said components in one of said two orientations dependent on the rotation of said component by said deflecting means.

12. Apparatus according to claim 11 in which said feed chute has at least a pair of spaced parallel walls for confining said components therein, said magnet means being oriented to generate a magnetic field substantially transverse to said walls to thereby orient said lead wires in the transverse direction for removal from said feed chute.

13. Apparatus according to claim 12 in which said magnet means is so oriented that the locus of maximum magnetic field intensity coincides with a path extending through said feed chute generally parallel to said walls from an entrance point to an exit point and inclined downwardly with respect to the horizontal, said components being constrained by said field to lie along said path and experiencing a gravitational force directed downwardly along said path and urging them forward to said exit point.

14. Apparatus according to claim 11 in which the means for removing said components from said feed chute comprises a rotating wheel mounted adjacent an exit point of said feed chute and having a plurality of notches about its outer periphery for receiving components therein, said components being pressed against said wheel and into said notches by the combined forces of gravity and of said magnetic field while in said feed chute as said wheel rotates about an axis below the feed chute.

15. A machine according to claim 11 in which said deflecting means comprises a pin positioned adjacent said test station and assymetrically located with respect to said component, said pin being operable to contact said component during a free fall of said component after release from said test station to thereby impart a selected rotation to said component prior to entrance of said component into the field established by said magnetic means.

16. A machine according to claim 15 in which said magnetic means comprises at least one permanent magnet positioned below said deflecting pin and in the path of said component, said magnet generating a magnetic field to limit rotation of said component after entrance of said component into said field.

* * * * *